(12) United States Patent
Perkins et al.

(10) Patent No.: US 7,388,886 B2
(45) Date of Patent: Jun. 17, 2008

(54) METHOD AND DEVICE FOR DISTRIBUTING COMMUNICATION SIGNALS

(75) Inventors: Matthew R. Perkins, Sunrise, FL (US); Spyros Kyperountas, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 920 days.

(21) Appl. No.: 10/414,838

(22) Filed: Apr. 16, 2003

(65) Prior Publication Data

US 2004/0208152 A1    Oct. 21, 2004

(51) Int. Cl.
*H04J 3/06* (2006.01)
(52) U.S. Cl. .......................... 370/507; 370/503
(58) Field of Classification Search ............ None
See application file for complete search history.

(56) References Cited

U.S. PATENT DOCUMENTS

| | | | |
|---|---|---|---|
| 6,725,158 B1 * | 4/2004 | Sullivan et al. | 701/213 |
| 7,069,312 B2 * | 6/2006 | Kostic et al. | 709/220 |
| 2002/0159544 A1 * | 10/2002 | Karaoguz | 375/329 |
| 2002/0167960 A1 | 11/2002 | Garcia-Luna-Aceves | |
| 2003/0224787 A1 * | 12/2003 | Gandolfo | 455/434 |

OTHER PUBLICATIONS

Elson, J. et al.: "Fine-Grained Network Time Synchronization Using Reference Broadcasts", Proceedings of the Fifth Symposium on Operating Systems Design and Implementation, OSDI 2002, Boston, MA, Dec. 2002, pp. 1-17.

Elson, J. et al.: "Wireless Sensor Networks: A New Regime for Time Synchronization", Proceedings of the First Workshop on Hot Topics in Networks, HotNets-I, Princeton, New Jersey, Oct. 28-29, 2002, six pages.

* cited by examiner

*Primary Examiner*—Ronald Abelson (57) ABSTRACT

A communications network (100) has coordinator devices (10) each transmitting a beacon message in a cluster area (30). Neighboring coordinator devices (1, 2) define overlap areas (60) in which each beacon message of the neighboring coordinator devices is present. Neighboring coordinator devices (1, 2) may also define non-overlap areas (204) in which each beacon message is present. A method for distributing communication signals includes providing nodes (50), (51,52) within a transmission region (30) of the coordinator devices (1, 2). The node (50) or nodes (51, 52) detect at least one beacon message of the neighboring coordinator devices (1, 2), determine the existence of a condition (302), and warn neighboring coordinator devices of the condition. The condition (302) is corrected by making an adjustment to the communication signal (such as beacon timing) by a correction amount (304).

24 Claims, 5 Drawing Sheets

METHOD AND DEVICE FOR DISTRIBUTING COMMUNICATION SIGNALS

BACKGROUND OF THE INVENTION

1. Field of the Invention

The invention lies in the field of electronic communications. The invention relates to a method and device for the distribution of communication signals.

2. Description of the Related Art

Figure 1:
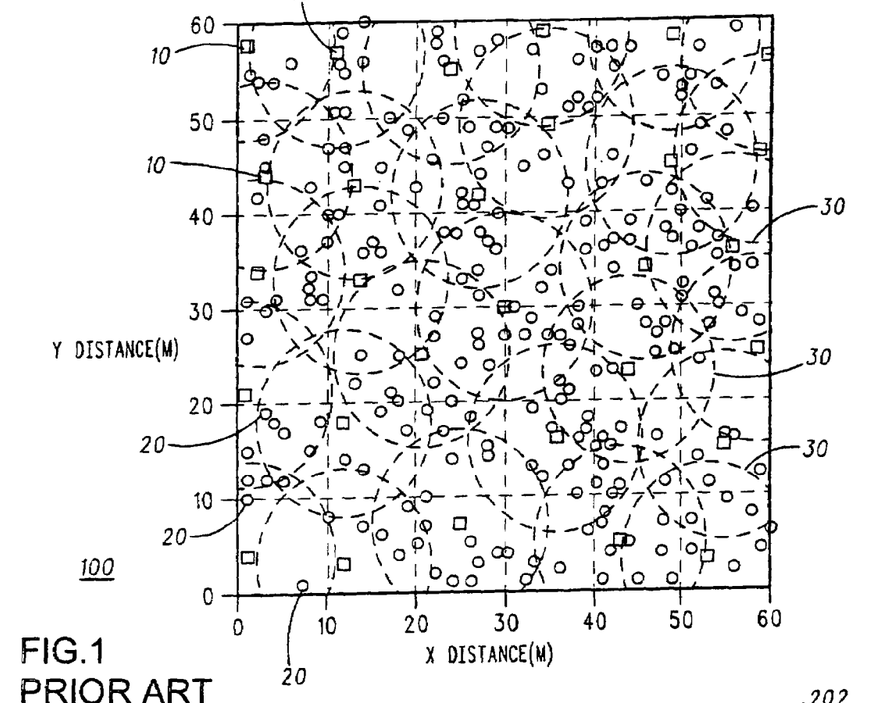
FIG. 1 is a coordinate mapping of a portion of a communications network with coordinating devices and nodes.

Global time-synchronization is an inherent problem with mesh networks. A portion of an example mesh network is illustrated in FIG. 1. This mesh network portion 100 includes a number of coordinating devices 10 and a larger number of slave nodes 20, typically, a significantly larger number, which, together, form the communications network. The slave nodes 20, preferably, represent the devices that communicate with each other through the network 100 of the coordinating devices 10. The nodes 20 can be transportable or they can be fixed in a given place. As set forth herein, if a node 20 is mobile, then the node can be transportable, fixed, or transportable but primarily remaining in a given location. Each node 20, therefore, is identified as being within or outside a transmission range of a given coordinating device 10. As used herein, then, identification of a node 20 refers to the status of that node 20 being within or outside the transmission range of a given coordinating device 10.

The coordinating devices 10 each have an internal timer for processing communications and data internally and for coordinating communication to other slave nodes 20 within the network 100. Coordination of beacons among different coordinating devices 10 occurs through transmitted time data in the form of a timing beacon. Each coordinating device 10, typically, but not necessarily, transmits omnidirectionally. The dashed circles surrounding each device 10 in FIG. 1, therefore, represent an example of a transmission coverage area for each coordinating device 10. The area covered by these exemplary circles can be referred to as a cluster 30 or beacon cluster.

To design such a communications network 100, important characteristics must be taken into account, specifically, power consumption and messaging overhead. Because low-power communications are desired in electronic communications networks, each cluster 30 has a limited transmission range. Accordingly, communication between non-adjacent clusters occurs by relaying the data through different clusters between a transmitting cluster 30 and a receiving cluster 30. From such a configuration arises the issue of how to synchronize different clusters so the transmission of one cluster does not interfere with or overlap in time with another cluster's communication activity.

With such constraints, distributing wireless ad-hoc network beacon clusters so that one cluster does not interfere with neighboring clusters is not a trivial task. Centralized synchronization techniques like high-power broadcasts and frame splitting are two techniques that require a significant amount of transmit power and a crippling amount of messaging overhead, respectively, to implement. Distributed synchronization techniques like post-facto synchronization also require a significant amount of overhead and only guarantee an "instant" of synchronized time for communication. No emphasis is placed on minimizing communication interference.

Figure 2:
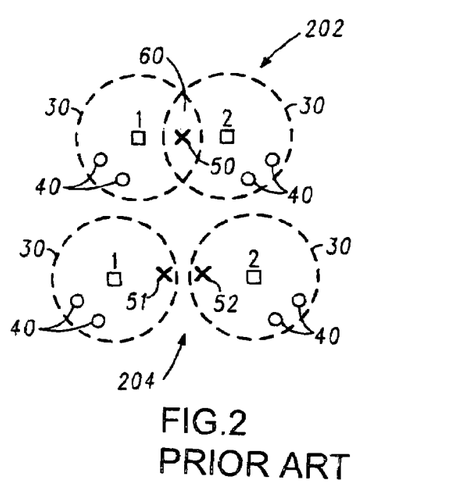
FIG. 2 is a diagrammatic illustration of a simplified wireless ad-hoc network with two clusters under various neighboring conditions, each transmitting a timing beacon.

To get a better understanding of the synchronization problem inherent in the mesh network 100, reference is now made to FIG. 2, which illustrates a simple wireless ad-hoc network with two clusters 30 represented under various neighboring conditions 202, 204. Under condition 202 the clusters 30 form an overlapping region 60 and under condition 204 the clusters 30 are non-overlapping. In either case, the coordinator device 1, 2 respectively located in the center of each cluster 30 coordinates the operations of each cluster 30. Each coordinator device 1, 2 periodically transmits a beacon message that provides timing information for any number of nodes 40 within the respective cluster 30. Generally, to participate in network communications, every node 40 in the network must be able to demodulate a beacon message from at least one coordination device 1, 2. Because mesh networks are often organized in an ad-hoc fashion, many protocols permit the coordinator devices 1, 2 to randomly pick when they will transmit their respective beacon message. In a distinctly possible event where two neighboring coordinator devices 1, 2 select the same random number, or select a number that is very close in time to a number selected by a neighboring coordinator device 1, 2, nearly simultaneous transmissions can create coverage nulls where the respective coverage areas overlap.

In this context, neighboring, as it refers to coordinator devices 1, 2, is a condition where any coordinator device can exchange communications directly or indirectly through a network of nodes and other coordinator devices. For example, neighboring can include a condition where two coordinator devices 1, 2 define or create an overlap of coverage areas 60 therebetween in which a border node 50 communicates with the two coordinator devices. Alternatively, neighboring can occur where two coordinator devices 1, 2 do not have an overlap of coverage area but each have a regular node 51, 52 in a respective coverage area with the two nodes being able communicate with one another. Neighboring can also include the condition where nodes in different coverage areas are not in direct communication with one another but yet exchange communications with one another through other nodes and/or coordinator devices.

If neighboring coordinator devices 1, 2 transmit beacons that interfere with each other then any node that is located in the overlap region (see, i.e., border node 50 in FIG. 2) will not be able to demodulate a beacon message and will, effectively, be isolated from the network, thereby creating a coverage null in the overlap region. If neighboring coordinator devices 1, 2 transmit beacons that interfere with each other in the non-overlap region, then any node that is located in the non-overlap region (see, i.e., regular nodes 51, 52 in FIG. 2) will not be able to demodulate a beacon message and will, effectively, be isolated from communicating with each other. To prevent the isolation from happening, beacon messages from neighboring clusters must be staggered so that they do not overlap.

There are many algorithms and techniques that can be used to keep these beacon intervals isolated, but, they typically require a global synchronization whereby one node (i.e., coordinator device 1, 2, 10 in the present example) is in charge of a "master" clock and every other node adjusts its respective clock according to the master clock. For multi-hop networks, however, such an algorithm creates a crippling amount of messaging overhead because the synchronizing messages have to be flooded to every node in the network on a continuous basis. Another option is to use a high power transmitter that maintains the global synchronization by extending its coverage area to include every node in the network. This second option is cost-prohibitive in terms of hardware and does not guarantee ubiquitous coverage. Additionally, because wireless sensor networks rely on long lasting battery life, any transmission network must employ an energy-efficient and, simultaneously, effective timing algorithm that minimizes transmission interference caused by synchronization discrepancies.

The article, "Wireless Sensor Networks: A New Regime for Time Synchronization". Proceedings of the First Workshop on Hot Topics in Networks, October 2002, Princeton, N.J., USA, by Elson, J. and Romer, K., confirms that energy efficiency is a significant concern for dynamic, ad hoc, wireless sensor networks. However, the authors conclude that traditional methods for time synchronization that apply for Network Time Protocol in the Internet do not apply for wireless sensor networks. The authors propose that each node in a wireless sensor network maintain an undisciplined clock, augmented with relative frequency and phase information to each of its local peers. While this document discusses current systems and their requirements and drawbacks, it does not provide any solution to the problem because, in their words, "[t]here are not yet any proven solutions for time synchronization in deployed WSNs [wireless sensor networks]." Id. at § 4.

The article, "Fine-Grained network Time Synchronization using Reference Broadcasts," Proceedings of the Fifth Symposium on Operating Systems Design and Implementation, December 2002, Boston, Mass., USA, by Elson, J., Girod, L., and Estrin, D., proposes a new scheme in which nodes send reference beacons to their neighbors using physical-layer broadcasts, referred to as Reference-Broadcast Synchronization or RBS. The reference broadcast of RBS does not contain an explicit timestamp. Instead, receivers use its arrival time as a point of reference for comparing their respective clocks. Such a process produces a high-precision clock agreement while using minimal energy to generate clocks across broadcast domains with a slow decay in precision. A fundamental property of the RBS design is that it synchronizes a set of receivers with one another, as opposed to traditional protocols in which senders synchronize with receivers.

United States Patent Publication 2002/0167960A1, titled "System and Method for Transmission Scheduling Using Network Membership Information and Neighborhood Information," discloses a method and system directed at providing collision-free transmission of packets into a channel.

Accordingly, there is a need for an improved communications network that overcomes the aforementioned problems associated with prior art mesh networks.

SUMMARY OF THE INVENTION

The invention provides a method and device for distributing communication signals that overcomes the hereinafore-mentioned disadvantages of the heretofore-known devices and methods of this general type and that provides a simple, efficient, distributed method for keeping mesh network clusters isolated in time and free from interfering with neighboring clusters and is simple to implement, does not require additional hardware, provides ubiquitous coverage, and is distributed across an entire network.

With the foregoing and other objects in view, there is provided, in accordance with the invention, a method for detecting communications signals by detecting beacon messages of neighboring coordinator devices in a cluster overlap area with a border node or with nodes from at least two different clusters (regular nodes). In accordance with the present invention, the nodes effectively operate as communication agents. Thus, an agent is selected from a group consisting of at least two regular nodes and at least one border node. Then, in accordance with the present invention, the agent detects a predetermined characteristic within the beacon messages and sends a prompt to the at least two coordinator devices in response thereto.

In accordance with the present invention, the communications signals are analyzed by determining a predetermined characteristic within the beacon messages, such as an overlap, a drift, a proximity, or a drift rate of neighboring coordinator devices utilizing a border node or the regular nodes. Distributing communications signals is performed by correcting a beacon drift, beacon proximity, or beacon overlap of beacon messages of neighboring coordinator devices by adjusting a timing of a beacon message by a correction amount. Distributing communication signals can also be performed by detecting beacon messages of neighboring coordinator devices in overlap areas with a border node, determining, via the border node, if an overlap warning condition exists for at least two of the neighboring coordinator devices, and correcting the overlap warning condition of the two neighboring coordinator devices by adjusting a timing of a beacon message of the neighboring coordinator device by a correction amount. Also, distribution of communication signals can be accomplished by warning at least one of neighboring coordinator devices of impending beacon overlap before the beacon overlap occurs or currently occurring beacon overlap, and providing the warning with a border node or with nodes from different neighboring clusters.

With the objects of the invention in view, there is also provided a device for distributing communication signals in a network of coordinator devices each transmitting beacon messages. The device includes a border node disposed in overlap areas of neighboring coordinator devices. The border node detects the beacon messages of the neighboring coordinator devices and determines if an overlap warning condition exists for at least two of the neighboring coordinator devices. Then, the border node communicates an existing overlap warning condition to at least one of the neighboring coordinator devices.

Other features that are considered as characteristic for the invention are set forth in the appended claims.

Although the invention is illustrated and described herein as embodied in a method and device for distributing communication signals, it is, nevertheless, not intended to be limited to the details shown because various modifications and structural changes may be made therein without departing from the spirit of the invention and within the scope and range of equivalents of the claims.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DESCRIPTION OF THE PREFERRED EMBODIMENTS

While the specification concludes with claims defining the features of the invention that are regarded as novel, it is believed that the invention will be better understood from a consideration of the following description in conjunction with the drawing figures, in which like reference numerals are carried forward.

Figure 3:
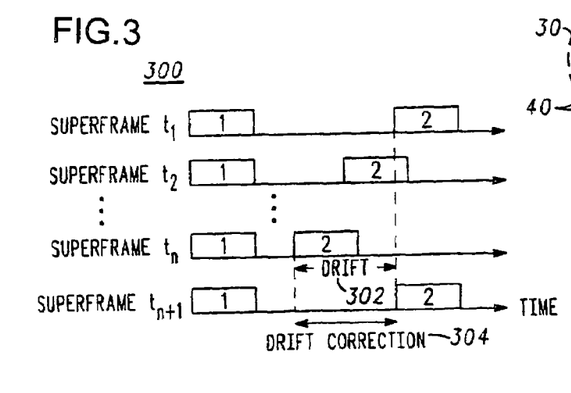
FIG. 3 is a sequential set of timing diagrams illustrating beacon times of the network of FIG. 2 drifting with respect to one another and corrected according to the invention.

Referring now to the figures of the drawings in detail and first, particularly to FIG. 3 thereof, there are shown beacon timing diagrams 300 corresponding to the two-cluster network of FIG. 2 under neighboring condition 202. FIG. 3 illustrates a situation where the beacon times for the coordinator devices 1, 2 of the clusters 30 are drifting closer and closer together over time. Specifically, for a given instant of time ti in the network, designated herein as a "Superframe," the beacon times for the coordinator devices 1, 2 start separated in time from one another. In an ad-hoc mesh network, beacon time drift 302 is, typically, inherent because each coordinator device 1, 2 does not have an internal clock that is exactly identical with any or all of the other coordinator devices 1, 2. In accordance with such a characteristic, Superframes $t_2$ through $t_n$ illustrate a beacon time period of coordinator device 2 that is drifting towards the beacon time period of coordinator device 1.

Because the coordinator devices 1, 2 are not in range with one another, they cannot communicate with each other directly in order to stay isolated from one another. On the other hand, they do share something in common that can be used to separate their beacons, specifically, a border node 50. In accordance with the present invention, node 50 detects the beacons of the coordinator devices 1, 2 and communicates with the coordinator devices 1, 2. In accordance with the present invention, the communication prompts an adjustment of one or both of the coordinator devices 1, 2. Based on the beacon characteristic being detected, the adjustment can be in the form of, for example, a drift correction 304 as represented in FIG. 3. Thus, Superframe $t_{n+1}$ illustrates a beacon time period for coordinator device 2 which has been corrected by shifting its time period back out with respect to coordinator device 1.

Border node 50 is positioned in the overlap region of the clusters 30 for coordinator devices 1 and 2. In this position, border node 50 can hear both beacon messages from coordinator devices 1 and 2. With this information, applying the present invention, border node 50 can determine a predetermined characteristic of the beacon messages. For example, the border node 50 can notice the drift, can determine a drift rate, and/or can determine the proximity of (i.e., closeness in time of) the beacon messages from coordinator devices 1 and 2. In response to determining the characteristic, border node 50 can send a prompt to warn coordinator devices 1 and 2 of beacon overlap or of beacon proximity before overlap occurs. By border node 50 being able to warn coordinator device 2 that its beacon is drifting towards the beacon of coordinator device 1, then coordinator device 2 can advance its own clock by a given drift amount and prevent any communications overlap. Again, this corrected condition 304 is illustrated in the scenario of Superframe $t_{n+1}$, where beacons for coordinator devices 1 and 2 do not overlap in time.

Border node 50 can include a processor programmed to perform the method according to the invention. For example, the processor can be programmed to detect the beacon messages of the neighboring coordinator devices 1, 2 and to determine if an overlap condition exists. If such a condition exists then a prompt is communicated from node 50 warning at least one of the two neighboring coordinator devices 1, 2 of the condition. The warning prompt signals the at least one of the coordinator devices 1, 2 to make a correction adjustment in its timing. For example, the coordinator device 1 or 2 might adjust an initiation time of its respective beacon message by a correction amount.

Alternatively, the first and second coordinator devices 1, 2 can be located within first and second non-overlapping coordinator device coverage areas 30 respectively, as was seen under neighboring conditions 204 of FIG. 2. Here again, in accordance with the present invention, the at least two coordinator devices 1, 2 are transmitting beacon messages, and the at least two regular nodes 51, 52, each located in the first and second coordinator device coverage areas, are capable of detecting a predetermined characteristic within the beacon messages. In response to the detected characteristic, at least one of the nodes 51, 52 sends a prompt to at least one of the two coordinator devices 1, 2. As was seen in the FIG. 3 timing diagrams, at least one of the first and second coordinator devices 1, 2 makes an adjustment, for example a drift correction 304, in response to the prompt. Thus, synchronized timing is re-established allowing for communication.

In accordance with a preferred embodiment of the invention, the correction can be explained in the following exemplary distribution algorithm:

IF my_beacon_time − beacon_time(neighbor) < Guard_Time
THEN my_beacon_time = my_beacon_time + $T_{shift}$,
where:
    my_beacon_time is coordinator device 2;
    beacon_time(neighbor) is coordinator device 1;
    $T_{shift}$ = 2·dT; and
    dT = beacon_time(neighbor) + Guard_Time − my_beacon_time.

This distribution algorithm can be adapted to any size network. Also, the algorithm is not restricted to defining $T_{shift}$ as being equal to two times dT. It should be understood that the example is a preferred embodiment and that $T_{shift}$ can be equal to or greater than dT.

Figure 4:
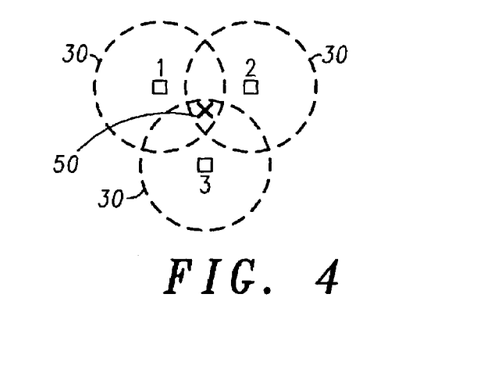
FIG. 4 is a diagrammatic illustration of a simplified wireless ad-hoc network with three clusters, each transmitting a timing beacon.
Figure 5:
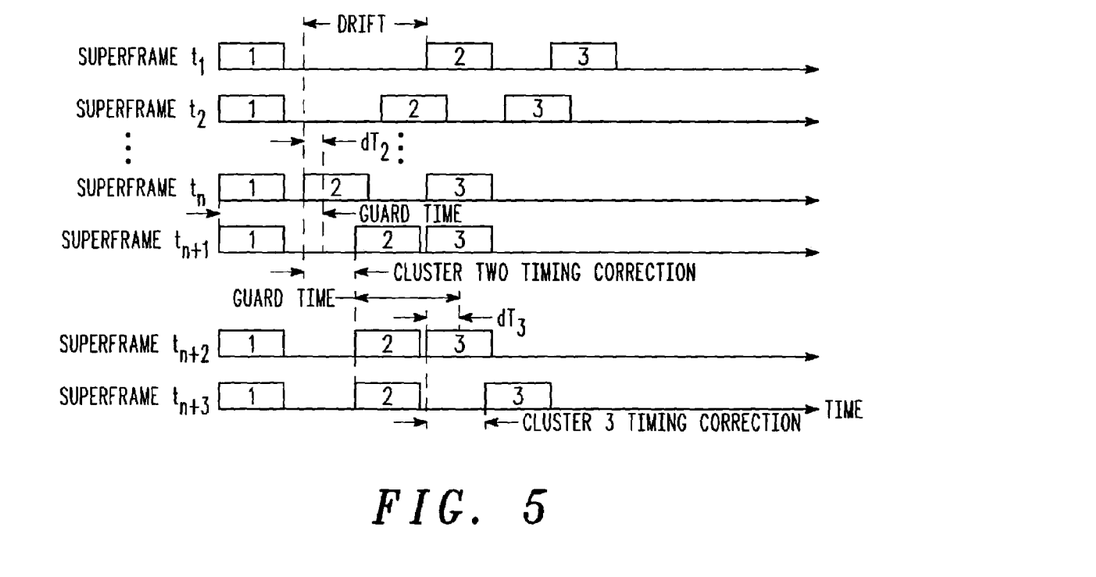
FIG. 5 is a sequential set of timing diagrams illustrating beacon times of the network of FIG. 4 drifting with respect to one another and corrected according to the invention.

To illustrate the flexibility of the algorithm of the present invention, a three-cluster network illustrated in FIG. 4 is examined along with the respective beacon timing diagrams illustrated in FIG. 5. In this example, it is assumed that the cluster-coordinator device 1 and the cluster-coordinator device 2 are drifting towards each other, a situation similar to the example of FIG. 3. Additionally, a third cluster of coordinator device 3 is defined in the example as drifting at nearly the same rate as the cluster of coordinator device 2, and, in the same direction. Accordingly, Superframes $t_2$ through $t_n$ illustrate a beacon time period of coordinator devices 2 and 3 that are both drifting towards the beacon time period of coordinator device 1. Finally, it is assumed for this example, that coordinator devices 2 and 3 are, initially, separated in time from one another by a period greater than Guard_Time.

During each Superframe, at least one coordinator device in the network runs the distribution algorithm and makes any necessary timing corrections. For Superframes $t_1$ and $t_2$, none of the three coordinator devices 1, 2, 3 make any corrections because the calculation: my_beacon_time-beacon_time (neighbor) for each coordinator device is greater than Guard_Time. During Superframe $t_n$, however, coordinator device 2 is informed by the border node 50 (directly or indirectly) that the difference between my_beacon_time and beacon_time(neighbor) is less than Guard_Time by a time of $dT_2$. Therefore, during the next Superframe, coordinator device 2 adjusts its beacon away from the beacon being transmitted by coordinator device 1 by a time equal to two times $dT_2$ (two being a multiple that is merely an exemplary embodiment). When the adjustment is made, however, the border node 50 detects in Superframe $t_{n+1}$ that coordinator devices 2 and 3 are, now, dangerously close together. Consequently, the border node 50 informs coordinator device 3 (directly or indirectly) to adjust its beacon away from the beacon being transmitted by coordinator device 2 by a time equal to 2 times $dT_3$. During the next Superframe, specifically, Superframe $t_{n+2}$, coordinator device 3 adjusts its clock, thereby freeing coordinator device 3 from interference. Although this example is very simple and utilized with only one border node, the concept can be extended to multiple clusters and to multiple border nodes.

Figure 6:
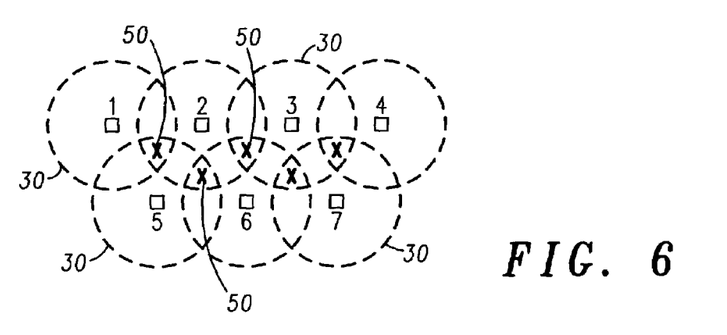
FIG. 6 is a diagrammatic illustration of a simplified wireless ad-hoc network with seven clusters, each transmitting a timing beacon.

A more complicated scenario is illustrated in FIG. 6. Here, seven clusters 30 are organized to form various overlaps in beacon coverage. As before, it is assumed that the coordinator devices 1 to 7 randomly picks a respective beacon time, which may or may not overlap with a beacon time of a neighboring cluster 30 of another coordinator device. Even if all coordinator devices 1 to 7 picked different beacon times, due to the non-ideal nature of clock drift, beacon times of neighboring clusters 30 tend to drift into one another over time. If each coordinator device 1 to 7 runs the above mentioned time distribution algorithm according to the present invention, then beacon overlap can be entirely eliminated.

Figure 7:
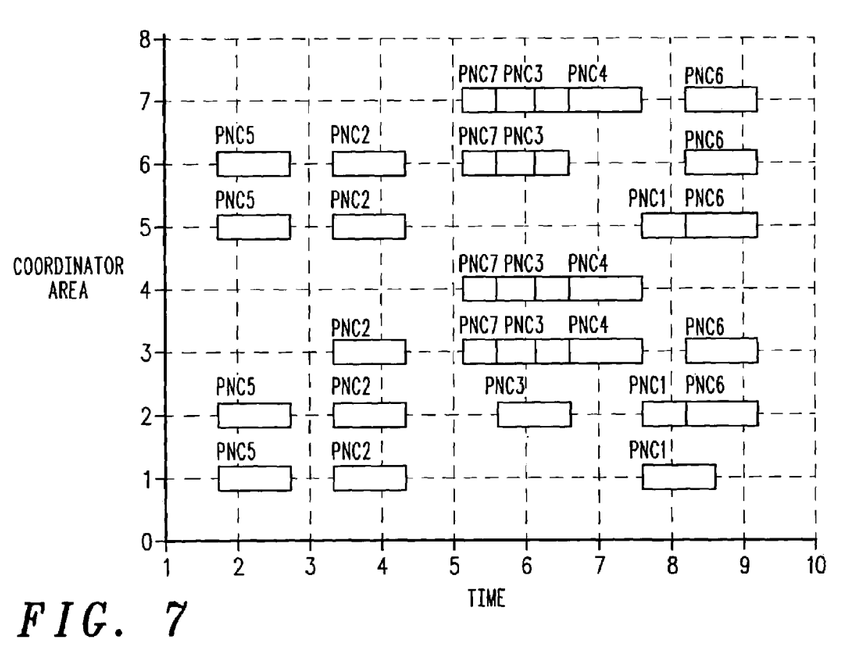
FIG. 7 is a graph illustrating an initial timing position of each respective beacon timing period that can be detected by each respective one of the coordinator areas corresponding to the clusters of FIG. 6.

For the sake of simplicity, an illustration of the algorithm according to the present invention for the seven-cluster network of FIG. 6 will be made using only initial and final timing diagrams of the simulation. FIG. 7 is an initial timing diagram for the seven-cluster network of FIG. 6. In the example of FIG. 7, it is assumed that all coordinator devices 1 to 7 have selected their respective beacon time randomly. The x-axis represents time and the y-axis represents a coordination device area or cluster number of interest. In the example, there are three areas of interest some of which require correction. Each will be discussed in turn.

In FIG. 7, coordinator area seven shows the beacon times for coordinator devices 3, 4, 6, and 7. An examination of the network diagram in FIG. 6 reveals that coordinator devices 3, 4, and 6 share coverage area with coordinator device 7. Therefore, to prevent inter-cluster interference, these four coordinator devices must be separated in time. It is noted that the current beacon time for coordinator device 3 overlaps the beacon time for the coordinator device 7. This overlap must be corrected. Coordinator areas seven also reveals that the beacon time for coordinator device 3 is dangerously close to the beacon time for coordinator device 4, in other words, the beacons are not separated at least by Guard_Time. To prevent overlap, therefore, the beacons for coordinator devices 3 and 4 must be safely separated in time.

Finally, coordinator area five is examined. As expected, coordinator area five "hears" beacons from coordinator devices 1, 2, and 6. The current beacon time for coordinator device 1 is shown as overlapping the current beacon time for coordinator device 6. However, because the coverage areas for coordinator devices 1 and 6 do not overlap, there is no need to perform any corrective action.

Figure 8:
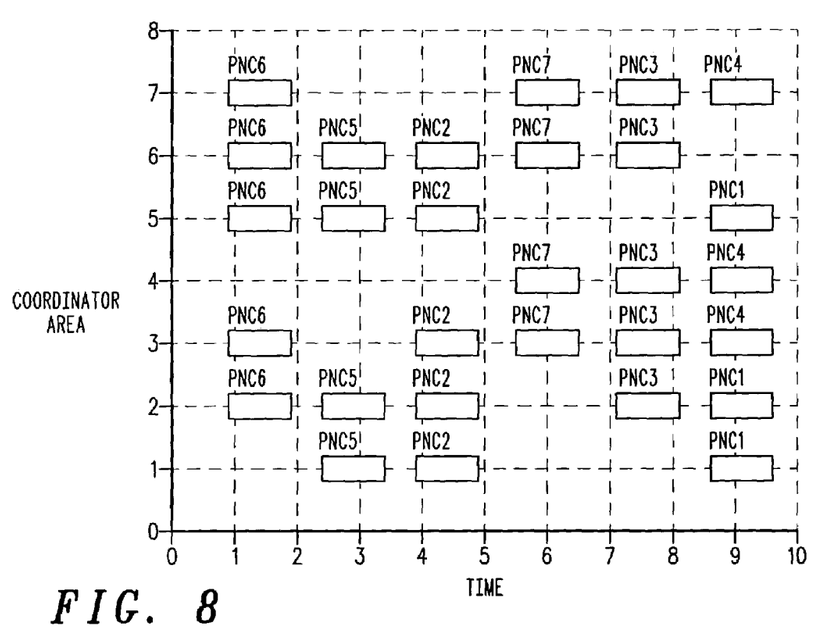
FIG. 8 is a graph illustrating a final timing position of each respective beacon timing period that can be detected by each respective one of the coordinator areas corresponding to the clusters of FIG. 6 after correction according to the invention.

FIG. 8 shows the final timing diagram after only a few iterations of the present invention. By separating each beacon message in time as a function of a respective coordination area, the algorithm of the present invention successfully prevents overlap without any significant messaging overhead, without having to send synchronizing messages to every node in the network on a continuous basis, and without requiring a high power transmitter. As mentioned earlier, the use of a high power transmitter in the prior art maintained global synchronization by extending its coverage area to include every node in the network. Thus, significant benefits have been achieved.

As noted above, when two coordination devices do not have an overlapping coverage area, the timing beacons can have any amount of timing overlap. This is shown in FIG. 8 when devices 1 and 4 share the same transmission time at the x-axis time "9." This is acceptable because the clusters of coordinator devices 1 and 4 do not physically overlap.

Using knowledge gained from nodes 50 that can monitor multiple beacon messages to inform beaconing coordinator devices 1 through 7 of possible interference problems allows an implementation of a distributed timing algorithm that is much simpler than the distributed or centralized, time-synchronization algorithms of the prior art.

Figure 9:
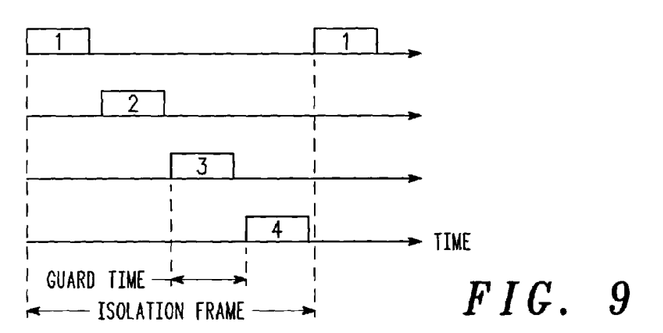
FIG. 9 is a sequential set of timing diagrams illustrating beacon times of a four-cluster low duty cycle network.
Figure 10:
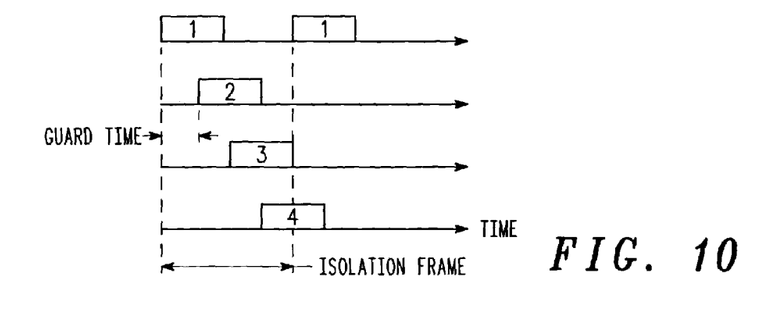
FIG. 10 is a sequential set of timing diagrams illustrating more frequent beacon times than the four-cluster network illustrated by the diagrams of FIG. 9.

The algorithm of the present invention can be scaled to fit any size network. The only parameters for adapting the algorithm include the "isolation frame size" and the Guard_Time. The isolation frame size is defined as the amount of time needed to isolate each beacon transmission. For low duty cycle operations, an isolation frame time may be very large, like the one shown in FIG. 9. Applications that require more frequent communications may configure the isolation frame to be very small, like the one shown in FIG. 10.

The timing algorithm of the present invention is not limited to a network of nodes that contain border nodes. This algorithm may also be applied to a network where nodes from neighboring clusters communicate with each other to share timing information regarding their respective cluster. In such an embodiment, independent nodes 51, 52 (possibly two nodes that are physically close enough to communicate with one another) can notice an impending overlap between two adjacent different coordinator devices 1, 2 and communicate to adjacent coordinator devices 10, respectively, to coordinate their cluster's beacon time.

Figure 11:
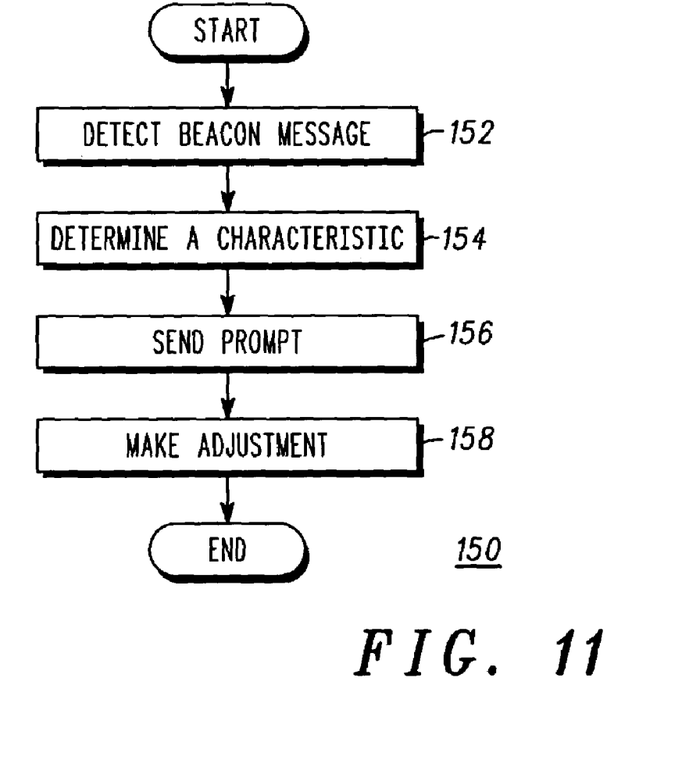
FIG. 11 is a flow chart of a method for distributing communication signals in accordance with the present invention.

FIG. 11 is a flowchart 150 summarizing how to bring about the adjustment of communication signals in accordance with the present invention with the following steps: detecting a beacon message 152, determining a characteristic within the beacon message 154, sending a prompt to a coordinator device in response to the characteristic 156, and making an adjustment at the coordinator device in response to the prompt 158. Thus, within a mesh network, the agents detect, determine, and prompt thereby enabling the coordinator devices to make adjustments. Referring back to FIGS. 1, 2, and 3, this means that within the mesh network 100 of FIG. 1, the agents (that is, the border node 50 or the regular nodes 51, 52 shown in FIG. 2) detect, determine, and prompt thereby enabling the coordinator devices 1, 2 to make adjustments, such as adjustment 304 of FIG. 3. This scenario repeats itself throughout the mesh network 100 providing for improved communications amongst the coordinator devices.

Figure 12:
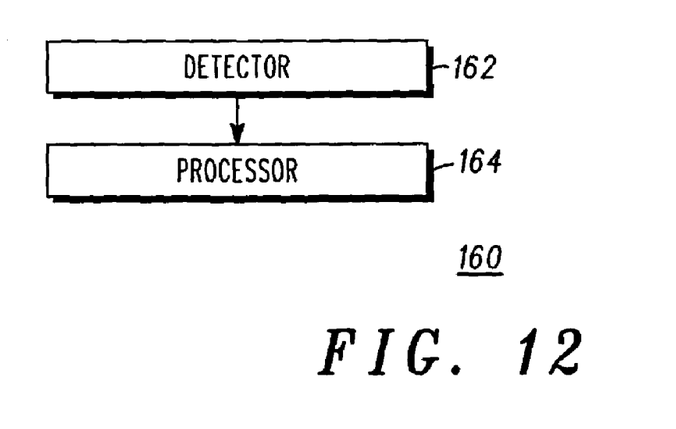
FIG. 12 is block diagram for a node in accordance with a preferred embodiment.

FIG. 12 provides a simplified block diagram 160 for a node in accordance with a preferred embodiment of the invention. A detector 162 and a processor 164 are included. The detector 162 and processor 164 can be incorporated within the agents (that is the within the border node and the regular nodes) or operatively coupled thereto.

The method and apparatus for controlling communication signals of the present invention can be applied to many kinds of electronic communications networks. Some exemplary wireless sensor networks can includes logistics, asset management, inventory management, building management, home automation, disaster recovery, and wartime intelligence.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

We claim:

1. A method for distributing communication signals, which comprises:
   providing an ad-hoc mesh network of communications coordinator devices each transmitting a beacon message in a transmission range defining a cluster area, defining a transmission region with a sum of all cluster areas, defining respective cluster overlap areas with neighboring coordinator devices in which overlap areas each beacon message of the neighboring coordinator devices is present;
   providing mobile communications nodes within the transmission region, the nodes defining at least one border node when at least one of the nodes is positioned in a cluster overlap area;
   detecting the at least one beacon message of the neighboring coordinator devices in a cluster overlap area with the at least one border node and determining, with the at least one border node, if an overlap warning condition exists for at least two of the neighboring coordinator devices;
   warning, with the at least one border node, at least one of the at least two neighboring coordinator devices of an existing overlap warning condition; and
   correcting the overlap warning condition of the at least two neighboring coordinator devices by adjusting a timing of the beacon message of the at least one neighboring coordinator device by a correction amount.

2. The method according to claim 1, which further comprises correcting currently occurring beacon overlap or impending beacon overlap of the at least two neighboring coordinator devices by adjusting the timing of the beacon message of the at least one neighboring coordinator device by the correction amount.

3. The method according to claim 1, which further comprises:
   determining an overlap, a drift, a proximity, and a drift rate of beacon messages of the neighboring coordinator devices with the at least one border node; and
   determining the overlap warning condition dependent upon at least one of the overlap, the drift, the proximity, and the drift rate.

4. The method according to claim 1, which further comprises defining the overlap warning condition as an impending beacon overlap or a currently occurring beacon overlap.

5. The method according to claim 1, which further comprises carrying out the warning step by transmitting the warning only to one of the at least two neighboring coordinator devices having a beacon message initiation time later than a beacon message initiation time of another one of the at least two neighboring coordinator devices.

6. The method according to claim 1, which further comprises carrying out the correcting step by correcting the overlap warning condition with only one of the at least two neighboring coordinator devices, the one of the at least two neighboring coordinator devices being a neighboring coordinator device having a beacon message initiation time later than a beacon message initiation time of another one of the at least two neighboring coordinator devices.

7. The method according to claim 1, which further comprises carrying out the correcting step by:
   defining a beacon guarding time; and
   running a distributing algorithm comprising the steps of:
      determining beacon message initiation times for each of the at least two neighboring coordinator devices;
      determining a latest one of the beacon message initiation times;
      setting a difference sum by subtracting an earlier one of the beacon message initiation times from the latest one of the beacon message initiation times;
      setting a beacon adjust sum to be at least as great as a sum of the difference sum and the beacon guarding time; and
      adjusting the latest one of the beacon message initiation times by the beacon adjust sum.

8. The method according to claim 7, which further comprises:
   defining a superframe of the ad-hoc mesh network; and
   individually running the distribution algorithm during each superframe with at least one of the at least two neighboring coordinator devices receiving the warning of the existing overlap warning condition.

9. The method according to claim 1, which further comprises:
   defining a superframe of the ad-hoc mesh network; and
   performing the detecting, determining, warning, and correcting steps with each border node during a superframe.

10. The method according to claim 1, which further comprises transmitting each beacon message at a randomly selected time.

11. The method according to claim 1, which further comprises transmitting each beacon message with a beacon having a given beacon message rate.

12. The method according to claim 11, which further comprises providing each beacon of the at least two coordinator devices with an individual beacon message rate.

13. The method according to claim 1, which further comprises disposing each of the coordinator devices outside a transmission range of another neighboring one of the coordinator devices.

14. The method according to claim 1, which further comprises permitting two of the at least two communications coordinator devices to share the same beacon message transmitting time when cluster areas of the two communications coordinator devices do not physically overlap.

15. A method for carrying out wireless communications, which comprises:
applying the method for distributing communication signals of claim 1 in a wireless electronic communications network selected from the group consisting of a logistics network, an asset management network, an inventory management network, a building management network, a home automation network, a disaster recovery network, and a wartime intelligence network.

16. A device for analyzing communications signals in a network of coordinator devices having cluster overlap areas, comprising:
an agent having:
means for detecting beacon messages of coordinator devices; and
a processor connected to said detecting means, said processor being programmed to determine at least one of an overlap, a drift, a proximity, and a drift rate of the beacon messages of neighboring coordinator devices, said processor further programmed to:
define a beacon guarding time; and
run a distributing algorithm programmed to:
determine beacon message initiation times for each of the at least two neighboring coordinator devices;
determine a latest one of the beacon message initiation times;
set a difference sum by subtracting an earlier one of the beacon message initiation times from the latest one of the beacon message initiation times;
set a beacon adjust sum to be at least as great as a sum of the difference sum and the beacon guarding time; and
adjust the latest one of the beacon message initiation times by the beacon adjust sum.

17. A device for warning coordinator devices having cluster overlap areas, said device comprising:
an agent having:
a beacon message detector adapted to detect beacon messages of coordinator devices; and
a processor connected to said detector, said processor being programmed to determine if beacon messages of neighboring coordinator devices are currently overlapping or will be overlapping, said processor further programmed to:
define a beacon guarding time; and
run a distributing algorithm programmed to:
determining beacon message initiation times for each of the at least two neighboring coordinator devices;
determining a latest one of the beacon message initiation times;
setting a difference sura by subtracting an earlier one of the beacon message initiation times from the latest one of the beacon message initiation times;
setting a beacon adjust sum to be at least as great as a sum of the difference sum and the beacon guarding time; and
adjusting the latest one of the beacon message initiation times by the beacon adjust sum.

18. The device according to claim 17, wherein:
said agent is to be disposed in a cluster overlap area; and
said beacon message detector is adapted to detect beacon messages of coordinator devices within the cluster overlap area.

19. A device for warning coordinator devices having cluster overlap areas, comprising:
at least two communications nodes to be disposed in different clusters, each of said communications nodes having:
a beacon message detector adapted to detect beacon messages of coordinator devices; and
a processor connected to said detector, said processor being programmed to determine if beacon messages of neighboring coordinator devices are currently overlapping or will be overlapping, said processor further programmed to:
define a beacon guarding time; and
run a distributing algorithm programmed to:
determining beacon message initiation times for each of the at least two neighboring coordinator devices;
determining a latest one of the beacon message initiation times;
setting a difference sum by subtracting an earlier one of the beacon message initiation times from the latest one of the beacon message initiation times;
setting a beacon adjust sum to be at least as great as a sum of the difference sum and the beacon guarding time; and
adjusting the latest one of the beacon message initiation times by the beacon adjust sum.

20. The device according to claim 19, wherein:
said at least two communications devices are to be disposed in different neighboring clusters; and
said beacon message detector is adapted to detect beacon messages of coordinator devices within the cluster overlap area.

21. In an ad-hoc mesh network of communications coordinator devices each transmitting a beacon message in a transmission range defining a cluster area, a sum of all cluster areas defining a transmission region, neighboring coordinator devices defining respective cluster overlap areas containing each beacon message of the neighboring coordinator devices, and mobile communications nodes being within the transmission region, a system for distributing communication signals, comprising:
at least one border node disposed in at least one overlap area of neighboring coordinator devices, said at least one border node having:
a detection device;
an agent; and
a processor connected to said detection device and to said agent, said processor programmed to:
detect at least one beacon message of the neighboring coordinator devices with said detection device;

determine if an overlap warning condition exists for at least two of the neighboring coordinator devices dependent upon the beacon messages detected;

communicate an existing overlap warning condition to at least one of the at least two neighboring coordinator devices through said communications device and signal the at least one neighboring coordinator device to adjust an initiation timing of a respective beacon message by a correction amount; and said processor being programmed to perform the detection, the determination, and the communication during a superframe defined by the ad-hoc mesh network.

22. The device according to claim 21, wherein said processor is programmed to communicate the existing overlap warning condition to only one of the at least two neighboring coordinator devices.

23. The device according to claim 21, wherein said processor is programmed to communicate the existing overlap warning condition to only one of the at least two neighboring coordinator devices having a beacon message initiation time later than a beacon message initiation time of another one of the at least two neighboring coordinator devices.

24. The device according to claim 21, wherein each of the coordinator devices is outside a transmission range of another neighboring one of the coordinator devices.

* * * * *

UNITED STATES PATENT AND TRADEMARK OFFICE
CERTIFICATE OF CORRECTION

PATENT NO. : 7,388,886 B2 Page 1 of 1
APPLICATION NO. : 10/414838
DATED : June 17, 2008
INVENTOR(S) : Perkins et al.

It is certified that error appears in the above-identified patent and that said Letters Patent is hereby corrected as shown below:

In Column 5, Line 45, delete "ti" and insert -- t1 --, therefor.

In Column 12, Line 1, in Claim 17, delete "sura" and insert -- sum --, therefor.

Signed and Sealed this

Twenty-first Day of July, 2009

JOHN DOLL
*Acting Director of the United States Patent and Trademark Office*